United States Patent
Pérez Salvador et al.

(10) Patent No.: US 10,721,924 B2
(45) Date of Patent: Jul. 28, 2020

(54) MULTI-OUTLET SPRAYER

(71) Applicant: Pulverizadores Fede, S.L., Valencia (ES)

(72) Inventors: Federico Pérez Salvador, Valencia (ES); Lars Torsten Berger, Valencia (ES)

(73) Assignee: Pulverizadores Fede, S.L., Valencia (ES)

( * ) Notice: Subject to any disclaimer, the term of this patent is extended or adjusted under 35 U.S.C. 154(b) by 79 days.

(21) Appl. No.: 16/069,380

(22) PCT Filed: Jan. 11, 2017

(86) PCT No.: PCT/ES2017/070013
§ 371 (c)(1),
(2) Date: Jul. 11, 2018

(87) PCT Pub. No.: WO2017/121915
PCT Pub. Date: Jul. 20, 2017

(65) Prior Publication Data
US 2018/0368386 A1    Dec. 27, 2018

(30) Foreign Application Priority Data

Jan. 12, 2016   (ES) .................. 201630019

(51) Int. Cl.
*A01M 7/00* (2006.01)
*B05B 1/30* (2006.01)
(Continued)

(52) U.S. Cl.
CPC .......... *A01M 7/0014* (2013.01); *A01M 7/00* (2013.01); *B05B 1/16* (2013.01); *B05B 1/169* (2013.01);
(Continued)

(58) Field of Classification Search
CPC ........ A01M 7/0014; A01M 7/00; B05B 1/16; B05B 1/169; B05B 1/26; B05B 1/30; B05B 1/3006; B05B 7/00
(Continued)

(56) References Cited

U.S. PATENT DOCUMENTS 2,551,789 A * 5/1951 Copley ............... A01M 7/0014
239/77
4,111,364 A * 9/1978 Schroeder ........... A01M 7/0014
239/77
(Continued)

FOREIGN PATENT DOCUMENTS

EP         1810568 A2    7/2007
EP         2193709 A2    6/2010
(Continued)

OTHER PUBLICATIONS

May 19, 2017—International Search Report—App PCT/ES2017/070013.

*Primary Examiner* — Steven J Ganey
(74) *Attorney, Agent, or Firm* — Banner & Witcoff, Ltd.

(57) ABSTRACT

The invention relates to a sprayer of the type comprising a turbine generating an air flow that is conveyed through a main duct to a distributor from where the air flow is conveyed through ports to a plurality of secondary ducts which direct the air flow to the exterior, bringing same into contact with the product mixture metered by nozzles located in the area through which the outgoing air stream flows, where the invention is characterised in that the air flow from the secondary ducts can be regulated by means of opening and closure elements that operate in a coordinated manner with at least one overflow channel, such as to help maintain a constant pressure inside the air ducts, preventing air from (Continued)

Figure 1:
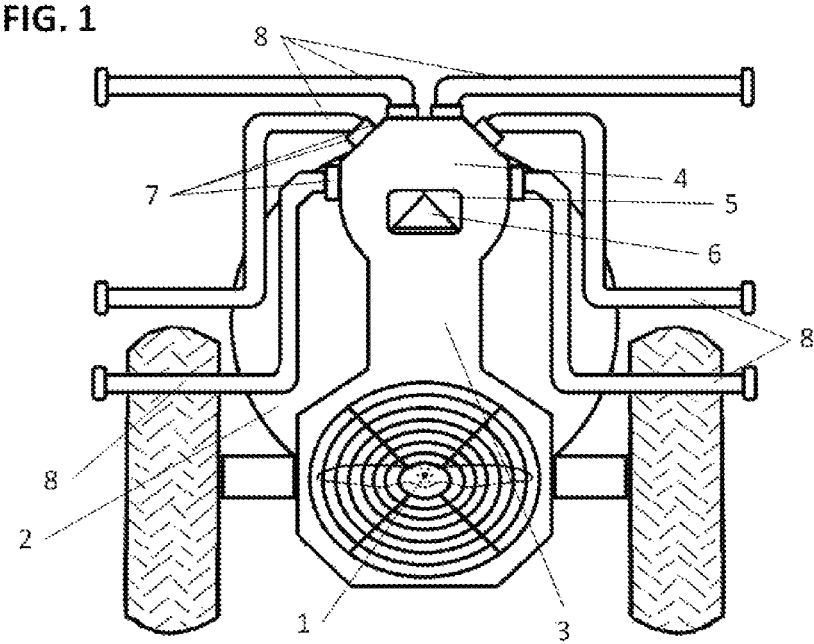

flowing back to the turbine, which could alter the operating conditions selected for the equipment.

10 Claims, 2 Drawing Sheets

(51) Int. Cl.
  *B05B 1/16* (2006.01)
  *B05B 1/26* (2006.01)
  *B05B 7/00* (2006.01)

(52) U.S. Cl.
  CPC ............... *B05B 1/26* (2013.01); *B05B 1/30* (2013.01); *B05B 1/3006* (2013.01); *B05B 7/00* (2013.01)

(58) Field of Classification Search
  USPC .............. 239/14.1, 77, 78, 159, 172; 47/2
  See application file for complete search history.

(56) References Cited

U.S. PATENT DOCUMENTS

| | | | | |
|---|---|---|---|---|
| 5,176,322 A | * | 1/1993 | Sartor | ............... A01M 7/0014 239/159 |
| 5,971,295 A | * | 10/1999 | Jensen | ............... A01M 7/0014 239/77 |
| 2004/0251313 A1 | * | 12/2004 | Burgess | ............ A01M 7/0014 239/100 |

FOREIGN PATENT DOCUMENTS

| | | |
|---|---|---|
| ES | 203659 U | 1/1976 |
| FR | 2727829 A1 | 6/1996 |
| FR | 2887119 A1 | 12/2006 |
| GB | 623068 A | 5/1949 |
| WO | 9317551 A1 | 9/1993 |
| WO | 0042840 a1 | 7/2000 |

\* cited by examiner

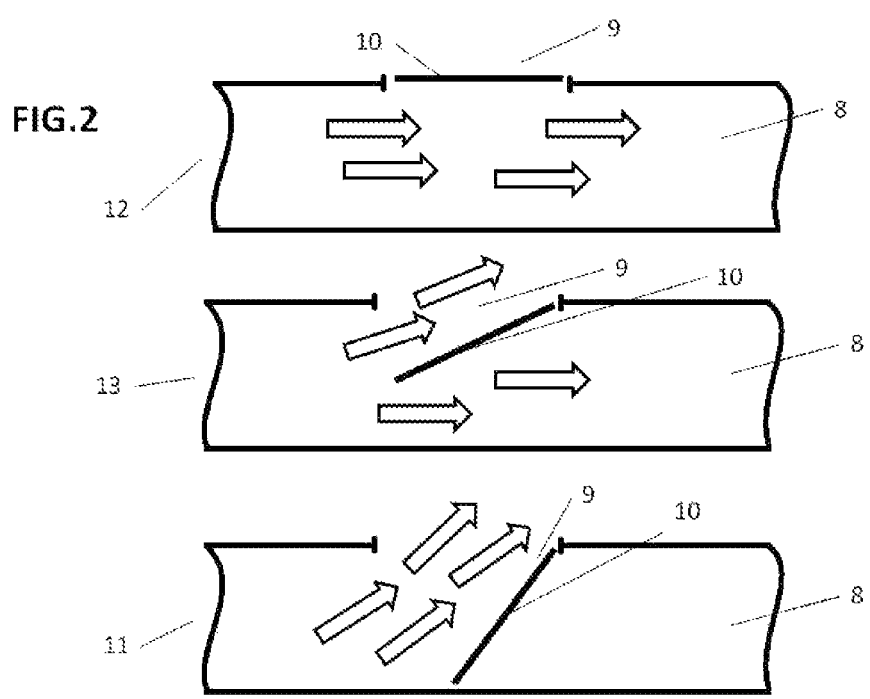

MULTI-OUTLET SPRAYER

The present application is a U.S. National Phase Application under 35 U.S.C. § 371 of PCT/ES2017/070013 filed Jan. 11, 2017 and applicant herewith claims the benefit of priority of ES P201630019 filed Jan. 12, 2017 which is incorporated by reference herein in its entirety.

The invention relates to a sprayer of the type comprising a turbine generating an air flow that is conveyed through a main duct to a distributor from where the air flow is conveyed through ports to a plurality of secondary ducts which direct the air flow to the exterior, bringing same into contact with the product mixture metered by nozzles located in the area through which the outgoing air stream flows. The invention is characterised in that the air flow from the secondary ducts can be regulated by means of opening and closure elements that operate in a coordinated manner with at least one overflow channel, such as to help maintain a constant pressure inside the air ducts, preventing air from flowing back to the turbine, which could alter the operating conditions selected for the equipment.

The sector of the art to which it pertains is that of sprayers and agricultural machinery.

BACKGROUND

Sprayers comprising a turbine which, through ducts, distributes the air flow to various points generating different spraying areas to allow acting on a crop from various positions, enhancing the application of the treatment, are well known and widely used.

Examples of this type of sprayers can be found in French patent FR2727829, where a turbine generates an air flow directed towards a box with a plurality of ports from which the secondary ducts emerge.

French patent FR2887119 also relates to a sprayer with multiple ports and outlets at different heights.

None of the cited patents appear to mention the presence of an air flow control at the ports, the secondary ducts or the outlets, nor the possibility of opening or closing same.

Another relevant document is patent EP1810568 relating to a sprayer with a plurality of ports at different heights comprising a deflector that divides the distributor in two, such that depending on the position of said deflector air will reach all ports or only those of the distributor area to which the air flow is directed.

A more recent document is EP2193709, which relates to a sprayer where the presence of excess air inside the sprayer is prevented by regulating the air flow generated using a circular seal that limits the entry of air into the suction duct that feeds the turbine.

However, the air flow generated is not always directly proportional to the greater or lesser opening of the suction duct, as reducing the suction duct can result in a vacuum being created that affects the expected operating conditions of the turbine, potentially leading to overloads, material fatigue or increased consumption, among other consequences.

Thus, if in order to control the outlet flow the air outlet is closed, completely or partially, and the inlet is not changed, there is an uncontrolled air return that affects the control of the outlet flow and the sprayer, as it is required to work in improper conditions and withstand inadequate loads.

If alternatively the air inlet is limited reducing the turbine suction duct, a vacuum is generated that can damage the sprayer as it will not be operating in the conditions for which it was designed.

DESCRIPTION OF THE INVENTION

To solve the aforementioned drawbacks, the invention relates to a sprayer comprising a turbine, a main duct, a distributor, a plurality of ports from which emerge a plurality of secondary ducts through which the air flow is directed to the outside, carrying with it the product to be metered supplied into the air current through nozzles present in the area of influence of the air current, where the air flow in the secondary ducts can be regulated by closure elements that act in coordination with one or more overflow channels that also have an opening and closure mechanism, said overflow channels arranged between the turbine and the closure elements of the secondary ducts.

Although a plurality of overflow channels may exist, the term overflow channel in singular will be used in this specification, comprising the existence of one or several.

Similarly, reference will be made in the specification to a shared overflow channel for the case of an overflow channel associated with a plurality of secondary ducts, and to a specific overflow channel for the case of an overflow channel associated with a single secondary duct.

When not specified, the term overflow channel should be understood to include both types of overflow channels, both shared and specific.

In an alternative embodiment the sprayer can include means for changing the air flow by either varying the rotation speed of the turbine or the arrangement of the turbine vanes, in which case these means will act in coordination with the opening and closure mechanisms of the secondary ducts and with the overflow channel.

To this end, the sprayer comprises:
1. A turbine that in an alternative embodiment can be regulated.
2. A main duct that directs the air flow generated by the turbine to a distributor.
3. A distributor with a plurality of ports.
4. A plurality of secondary ducts associated with said ports.
5. Closure elements for the secondary ducts, which can be regulated to change the air passage section of the secondary ducts.
6. Means for combining the opening or closing of more than one nozzle at the same time.
7. At least one overflow channel arranged at a point of the air path between the turbine and the closure elements of the secondary ducts.
8. Means for controlling the opening or closing of the overflow channel.
9. Means for coordinating the opening or closing of the overflow channel with the opening or closing of the secondary ducts.

In this way the sprayer will generate an air flow with the turbine that will be led through a main duct to a distributor.

According to the proposed sprayer, the user can determine which secondary ducts will be closed and which will be regulated.

A secondary duct is considered to be closed when no air flow passes through it, or at least no air flow allowing spraying, while a secondary duct is considered to be regulated when it is open at least in part, allowing passage of an air flow that permits spraying, where said opening can be regulated.

The closing elements of the ducts comprise moving elements and sealing elements. The moving elements, such as pistons or actuators of a different type, act on the sealing elements, such as covers or diaphragms, among others.

The term pistons of the secondary nozzles relates to moving elements of the secondary ducts of any type.

The term sealing elements of the secondary ducts includes covers, diaphragms or any device allowing to vary the aid passage area of the secondary ducts.

Depending on the number of pistons, different combinations of secondary ducts are allowed. For example, in a system with a single piston the closure elements of all the secondary ducts will act at the same time.

If there are two pistons there will be two sets of secondary ducts, and the regulation thereof can be different. For example, if each piston acts on the ducts of one side of the system, all the secondary nozzles of one side of the sprayer can be closed while the secondary ducts of the other side are regulated.

In another possible embodiment there is one piston for each secondary duct, in which case each of the secondary ducts can be regulated or closed individually.

That is, any combination is possible depending on the number of pistons in the device, which is why it is convenient to have one or more overflow channels that can release to the outside the return air from the secondary ducts.

It is not ruled out as a form of embodiment that the closure elements of the secondary ducts be at a point along the secondary ducts and not necessarily at the inlet thereof or at the ports, and that each secondary duct or at least one of them has a corresponding overflow channel, referred to as a specific overflow channel, in which case an embodiment would be possible wherein the closure elements of the secondary ducts and the opening and closing mechanisms of the specific overflow channel share elements or even that the same device, due to its shape, closes the duct when opening the specific overflow channel or vice versa.

The regulation or closure of secondary ducts is important to control the outgoing flow in each case, and is also a way to prevent spraying or blasting air in areas without crop, with the corresponding control by the user.

It is also important to carry out the treatment with the amount of air appropriate according to the phenological state of the crop, which will change size and therefore the amount of air needed for correct application, thereby preventing both drift of product in the environment and an unnecessary use of power in different applications.

By regulating or closing one or more secondary ducts the air flow is prevented from escaping to the outside in the same way as when all the ducts are regulated and fully open, so that the pressure inside the sprayer increases and the rejected air, which cannot escape, will seek other outlets returning to the main duct, where it meets the air flow generated by the turbine and hinder passage thereof.

The situation is even worse if the rejected air reaches the turbine.

The unit is designed to operate in conditions of air generating and pressurised liquid with a specific power consumption, and all the components are arranged to withstand this load mechanically for a long time; this can be affected by any overload due to excessive pressure caused by closing the various ducts, reducing the air outlet section. This system allows maintaining the operating conditions for which this equipment is designed and arranged at all times.

To avoid overloading the elements of the sprayer and its forced actuation, in a manner coordinated with the regulation or closure of the secondary ducts, an opening or closing mechanism for at least one overflow channel operates, placed at a point on the path of the air flow entering the turbine and the closing elements of the secondary ducts.

This mechanism for opening or closing the overflow channel can be of the type that seal or open the passage, leaving an opening of the overflow channel orifice calculated to displace the rejected air during the spraying operation, or a valve-like mechanism that opens at a certain pressure to release the rejected air until stabilising the internal pressure in the sprayer.

The coordinated action of all the elements of the system can be executed by a processor and a method for determining the correct air flow in each case, which then calculates for such air flow the positions to be adopted by each closing element of the ducts and of the overflow channels.

As described above, these effects can be mitigated by changing the air flow generated by the turbine, which can be done if the sprayer has a turbine with an adjustable flow rate.

Regulation of the air flow generated by the turbine can be achieved by changing the rotation speed or the position of the vanes of the turbine. There are various means available for changing the rotation speed, such as a gear box or power regulator if it is an electric turbine, and to change the position of the vanes there are also various systems in the market, as well as diverse patent literature.

If the sprayer comprises an adjustable turbine, it must act coordinated with the closure elements of the secondary ducts and with the overflow channels.

In an alternative embodiment there is a specific overflow channel in each secondary duct. To this end the closure elements of the secondary ducts can be at any point therein, and the specific overflow channel of each secondary duct can be at a point between the corresponding duct and said closure elements, and the opening and closing mechanisms of the specific overflow channel can in turn be the closure elements of the secondary duct, in which case they are referred to as common flow regulation element, and will be associated with the specific overflow channel and the secondary duct.

BRIEF DESCRIPTION OF THE FIGURES

FIG. 1 shows a schematic representation of the basic elements of the sprayer, with the turbine (1) arranged in this case at the rear of a container trailer (2), although it can also be arranged at the rear of a tractor, the main duct (3), the distributor (4), the overflow channel, in this case an overflow channel (5) shared with the opening and closing mechanism of the shared overflow channel (6), the ports (7) and the secondary ducts (8).

FIG. 2 shows a schematic representation of an alternative embodiment representing at three different moments in time a secondary duct (8) incorporating its specific overflow channel (9) and where the sealing element of the secondary duct is at the same time the closing mechanism of the specific overflow channel, and is referred to as the common flow regulation element (10). For sake of clarity this secondary duct is shows at three different moments, where in the first moment (12) the specific overflow channel (9) is completely closed and the air flow, represented by arrows, runs inside the secondary duct (8), while at the second moment (13) the common flow regulation element (10) is partially displaced allowing the air flow, represented by arrows, to circulate in part through the secondary duct (8) and in part to reach the outside through the specific overflow channel (9), and at the third time (11) the common flow regulation element (10) is completely displaced, closing the secondary duct (8) thereby preventing the air flow, represented by arrows, from circulating through the secondary duct (8) reaching the outside through the specific overflow channel (9).

DESCRIPTION OF AN EMBODIMENT OF THE INVENTION

An embodiment of the invention is described in a non-limiting sense for purposes of illustration only.

The invention relates to a multi-outlet sprayer, that is, a sprayer with multiple spray ducts referred to herein as secondary ducts (8).

It is desirable to control the air flow leaving the ducts or even to close one or some of these, closing the air passage thereof, which is achieved by closing elements arranged in this embodiment in the ports (7) with which the secondary ducts are associated.

Said closing elements comprise a piston that acts on a gate which closes completely or partially the air passage area of the secondary ducts. In the embodiment described herein there is one piston for each secondary duct.

The total or partial closure of one or some ducts generates a return flow due to the air flow that cannot leave through them, increasing the pressure inside the sprayer as the turbine (1) continues to introduce air in the main duct (3), which air cannot reach the distributor (4).

In the distributor (4) is a shared overflow channel (5) with an apertured adjustable via an opening and closing mechanism (6) of the overflow channel.

The opening and closing mechanism (6) of the overflow channel acts in coordination with the closing elements of the secondary ducts arranged, in this embodiment, in the ports (7) for which the sprayer has an electronic element that governs both, calculating that the free aperture in the overflow channel allows the exit of the air flow rejected by the closure, total or partial, of the secondary ducts.

A device such as that described comprises:
1. A turbine (1), which in this case is a constant flow turbine but could be an adjustable flow turbine.
2. A main duct (3) that carries the air generated by the turbine towards a distributor.
3. A distributor (4).
4. A series of ports (7) associated with as many secondary ducts (8).
5. A series of closing elements for the secondary ducts.
6. Means for controlling the air flow inside the sprayer, which comprise:
   a. A shared overflow channel (5) arranged in the distributor (4)
   b. A mechanism (6) for opening and closing the overflow channel.
   c. Means for coordinating the closing elements of the secondary ducts with the opening and closing mechanisms of the overflow channel.

In an embodiment in which the turbine can be regulated to control the air flow, either by varying the rotation speed or by varying the position of the vanes, the sprayer comprises means for coordinating the air flow generated by the turbine, the closing elements of the secondary ducts and the opening or closing mechanism of the overflow channel.

The invention claimed is:

1. A MULTI-OUTLET SPRAYER including a turbine with vanes therein, a main duct that conveys air generated by the turbine to a distributor connected to a plurality of ports associated with secondary ducts that direct air current to outside of the turbine, carrying with the sprayer, product to be sprayed metered by a series of nozzles arranged in an area of influence of the air current, the multi-outlet sprayer comprising:
   Closing elements configured to regulate the air current in the secondary ducts;
   a Control means, including a processor, configured for controlling the air current inside the sprayer, wherein the control means further comprises:
   a. At least one overflow channel at a point between the turbine and the closing elements of the secondary ducts;
   b. At least one mechanism for opening and closing the at least one overflow channel;
   c. Means for coordinating the closing elements of the secondary ducts with the opening and closing mechanism of the at least one overflow channel; and
   d. Means for controlling the speed of rotation of the turbine, to either keep the speed constant or vary the speed of rotation.

2. The MULTI-OUTLET SPRAYER according to claim 1, wherein the turbine further comprises a gear box.

3. The MULTI-OUTLET SPRAYER according to claim 1, wherein the turbine is electric and further comprises a power regulator.

4. The MULTI-OUTLET SPRAYER according to claim 1, wherein the turbine is configured to change a position of the vanes.

5. The MULTI-OUTLET SPRAYER according to any of the preceding claims, wherein the opening and closing mechanism of the at least one overflow channel comprise at least one valve.

6. The MULTI-OUTLET SPRAYER according to claim 1, wherein the closing elements of the secondary ducts act in a synchronised manner in two or more of the secondary ducts.

7. The MULTI-OUTLET SPRAYER according to claim 1, further comprising the means for opening and closing the secondary ducts being arranged in the ports.

8. The MULTI-OUTLET SPRAYER according to claim 1, wherein in at least one secondary duct there is a specific overflow channel.

9. The MULTI-OUTLET SPRAYER according to claim 8, wherein a common flow regulation element is associated with the specific overflow channel and with the secondary duct.

10. The MULTI-OUTLET SPRAYER according to claim 1, wherein the at least one overflow channel further comprises a shared overflow channel and is arranged between the turbine and the ports.

* * * * *